(12) United States Patent
Hosotani et al.

(10) Patent No.: US 6,639,811 B2
(45) Date of Patent: Oct. 28, 2003

(54) SWITCHING POWER SUPPLY UNIT

(75) Inventors: Tatsuya Hosotani, Muko (JP); Hiroshi Takemura, Muko (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/232,901

(22) Filed: Sep. 3, 2002

(65) Prior Publication Data

US 2003/0048645 A1 Mar. 13, 2003

(30) Foreign Application Priority Data

Sep. 10, 2001 (JP) ........................................ 2001-273915

(51) Int. Cl.⁷ ............................................. H02M 3/338
(52) U.S. Cl. ........................................ 363/19; 363/56.03
(58) Field of Search .............................. 363/16, 17, 18, 363/19, 55, 56.01, 56.03

(56) References Cited

U.S. PATENT DOCUMENTS

| | | | |
|---|---|---|---|
| 4,958,268 A | * 9/1990 | Nagagata et al. | 363/16 |
| 5,055,747 A | * 10/1991 | Johns | 315/307 |
| 5,570,278 A | 10/1996 | Cross | |
| 5,973,937 A | * 10/1999 | Yasumura | 363/19 |
| 6,038,143 A | * 3/2000 | Miyazaki et al. | 363/19 |
| 6,577,511 B2 | * 6/2003 | Yamaguchi et al. | 363/21.07 |

FOREIGN PATENT DOCUMENTS

| | | |
|---|---|---|
| JP | 4-87560 | 3/1992 |
| JP | 6-36392 | 5/1994 |
| JP | 10-500834 | 1/1998 |
| JP | 11-187664 | 7/1999 |

OTHER PUBLICATIONS

Koji Yoshida et al., "Zero voltage Switching Approach for Flyback Converter", Corporate Products Development Center, Matsushita Electronic Components Co., Ltd., Osaka , Japan, Aug. 1992, pp. 324–329.

Robert Watson et al., "Utilization of an Active–Clamp Circuit to Achieve Soft Switching in Flyback Converters", IEEE Transactions on Power Electronics, vol. 11, No. 1 Jan. 1996, pp. 162–169.

G. Spiazzi et al., "Design Optimization of soft–Switched Insulated DC/DC Converters With Active Voltage Clamp", Dept. of Electronics and Informatics, Dept. of Electrical Engineering, University of Padova, Italy, Sep. 1996, pp. 1169–1176.

* cited by examiner

Primary Examiner—Adolf D. Berhane
(74) Attorney, Agent, or Firm—Keating & Bennett, LLP

(57) ABSTRACT

A switching power supply unit includes first and second switching elements which are alternately turned on/off so as to perform self-excited oscillation. An inductor and a capacitor resonate during an OFF-period of the first switching element. After the second switching element is turned on, a resonance current applied to a series circuit including the second switching element and the indictor is interrupted before energy is completely emitted from a secondary winding. Accordingly, a voltage is generated at the inductor and a voltage at a transformer is reversed. The switching power supply unit also includes an ON-time control circuit in which a time constant is set so as to turn off the second switching element accordingly.

21 Claims, 9 Drawing Sheets

(KNOWN DEVICE)

(DEVICE OF THE EMBODIMENT)

Fig. 7A WAVEFORM OF CURRENT Id1
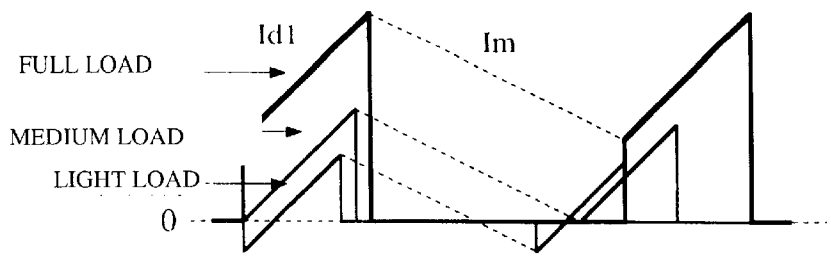
Fig. 7B CURRENT Id1 WHEN SWITCHING FREQUENCY IS CONSTANT
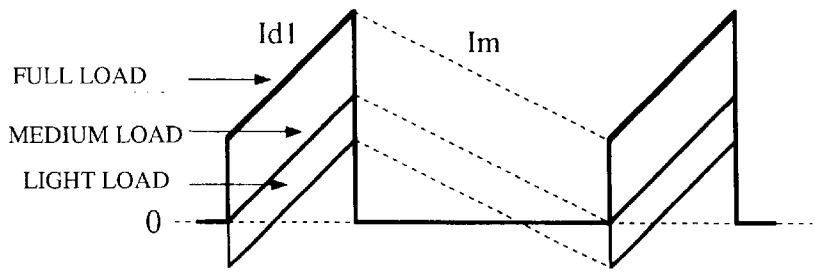
Fig. 7C CURRENT Id1 WHEN CIRCULATING CURRENT IS DECREASE UNDER LIGHT LOAD
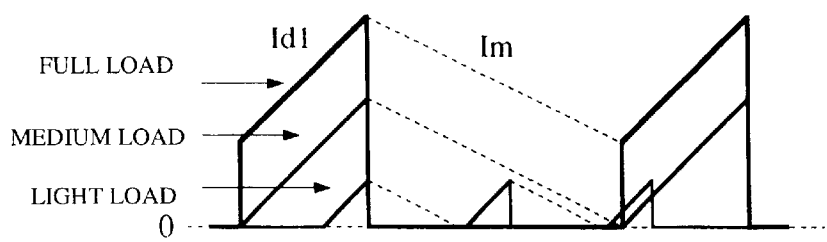
Fig. 7D CURRENT Id1 IN THE KNOWN ART
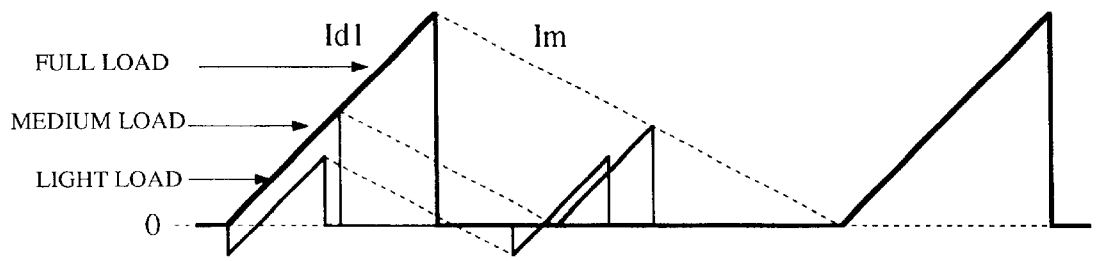

SWITCHING POWER SUPPLY UNIT

BACKGROUND OF THE INVENTION

1. Field of the Invention

The present invention relates to switching power supply units for supplying DC stabilized voltages. More specifically, the present invention relates to a switching power supply unit which operates in a current-continuation mode by allowing two switching elements to alternately turn on/off so as to perform self-excited oscillation.

2. Description of the Related Art

Japanese Unexamined Patent Application Publication No. 11-187664 discloses a switching power supply unit, in which first and second switching elements Q1 and Q2 are connected on the primary side of a transformer T, switching control circuits for alternately turning on/off the first and second switching elements, with a period when both the first and second switching elements are turned off therebetween, are provided, energy is stored in a primary winding and an inductor L during an ON-period of the first switching element Q1, the energy is emitted from a secondary winding during an OFF-period of the first switching element Q1, and the first and second switching elements Q1 and Q2 perform self-excited oscillation. The switching power supply unit having this configuration is called a flyback self-excited oscillation switching power supply unit including two switching elements.

Other examples of flyback switching power supply units including two switching elements are disclosed, for example, in Japanese Unexamined Patent Application Publication No. 4-87560, Japanese Unexamined Utility Model Registration Application Publication No. 6-36392, and PCT Japanese Translation Patent Publication No. 10-500834. The flyback switching power supply units disclosed in these publications have the same configuration as that of the switching power supply unit disclosed in Japanese Unexamined Patent Application Publication No. 11-187664 such that two switching elements are provided on the primary side of the transformer T. However, the two switching elements of these switching power supply units do not perform self-excited oscillation. In addition, these switching power supply units operate in a current-continuation mode. In the current-continuation mode, a current is applied to the secondary side of a transformer T and is then applied continuously to the primary side without a pause such that the waveform of the current applied to the primary switching element is trapezoidal. On the other hand, a current-discontinuation mode includes a pause such that a current is applied to neither the primary side nor the secondary side, and the waveform of the current applied to the primary switching element is triangular.

However, the above-described known switching power supply units have the following defects.

Next, the defects of the flyback self-excited oscillation switching power supply unit disclosed in Japanese Unexamined Patent Application Publication No. 11-187664 will be described.

In this switching power supply unit, the waveform of the current applied to the primary winding is always triangular, such as in ringing choke converters. Accordingly, a peak current on the primary side increases under heavy load and the effective current increases. When an effective current increases, copper loss of the transformer and conduction loss of the switching elements increase, and thus, efficiency decreases. This prevents miniaturization of a switching power supply unit.

Furthermore, since the waveform of the current applied to the primary winding is triangular, an ON-time of the switching element increases under heavy load. In addition, an OFF-time also increases in accordance with the extension of the ON-time. Accordingly, the switching period increases and the switching frequency decreases. As a result, a large transformer, a smoothing capacitor on the secondary side, and other components are required, which prevents miniaturization of a switching power supply unit.

Next, defects of the flyback two-element switching power supply unit which operates in a current-continuation mode disclosed in Japanese Unexamined Patent Application Publication No. 4-87560 will be described.

The waveform of the current applied to the primary winding is trapezoidal, and thus, copper loss of the transformer and conduction loss of the switching elements is reduced. However, since this type of switching power supply unit does not perform self-excited oscillation, a high-pressure-resistance drive IC or a pulse transformer is required for driving an oscillation circuit, a totem-pole circuit for driving, and an upper switching element at a different ground level, as a drive control circuit for alternately turning on/off the two switching elements. As a result, miniaturization and cost reduction for a switching power supply unit cannot be sufficiently achieved.

SUMMARY OF THE INVENTION

In order to overcome the above-described problems, preferred embodiments of the present invention provide a highly efficient switching power supply unit having greatly reduced size and weight and which is produced at a greatly reduced cost.

Preferred embodiments of the present invention provide a new technique for combining the operation characteristic of the known flyback two-element switching power supply unit operating in a current-continuation mode with a self-excited oscillation method. The switching power supply unit of various preferred embodiments of the present invention includes the following combination and arrangement of elements.

According to a first preferred embodiment of the present invention, a switching power supply unit operating in a current-continuation mode includes a transformer including a primary winding, a secondary winding, a first drive winding, and a second drive winding, an inductor, a first switching circuit connected in series to a series circuit including the primary winding and the inductor, the first switching circuit including a parallel circuit having a first switching element, a first diode, and a first capacitor, an input power supply connected in series to the series circuit, a second switching circuit connected in parallel to the series circuit, the second switching circuit including a parallel circuit having a second switching element, a second diode, and a second capacitor, a capacitor connected in parallel to the series circuit, a rectifying and smoothing circuit which includes a rectifying element and which is connected to the secondary winding, and first and second switching control circuits for alternately turning on/off the first and second switching elements, with a period when both the first and second switching elements are turned off therebetween, the first switching control circuit being connected between the first drive winding and a control terminal of the first switching element and the second switching control circuit being connected between the second drive winding and a control terminal of the second switching element.

Energy is stored in the primary winding and the inductor during an ON-period of the first switching element and the energy is emitted from the secondary winding during an OFF-period of the first switching element such that the first and second switching elements perform self-excited oscillation. The inductor and the capacitor define a resonance circuit which resonates during the OFF-period of the first switching element. The first switching control circuit includes a first ON-time control circuit in which a time constant is set such that the first switching element is turned off at a desired time after the first switching element is turned on. The second switching control circuit includes a second ON-time control circuit in which a time constant is set such that the second switching element is turned off in order to interrupt a resonance current applied to a series circuit including the second switching element and the inductor after the second switching element is turned on and before the energy is completely emitted from the secondary winding.

With this configuration, the first ON-time control circuit and the second ON-time control circuit defining the first and second switching control circuits operate in a different manner. In a flyback self-excited oscillation switching power supply unit as disclosed in Japanese Unexamined Patent Application Publication No. 11-187664, a second ON-time control circuit for controlling a second switching element Q2 on the primary side of a transformer T turns off the second switching element Q2 after energy is completely emitted from a secondary winding. On the other hand, in preferred embodiments of the present invention, the second ON-time control circuit forces the resonance current applied to the series circuit having the second switching element and the inductor to be interrupted after the second switching element is turned on and before the energy is completely emitted from the secondary winding. That is, in the second ON-time control circuit, a desired time constant is set such that this operation is performed.

According to the second ON-time control circuit, the second switching element is turned off so as to interrupt the current applied to the inductor before the energy is completely emitted from the secondary winding. Due to this change in current, the voltage at the primary winding is reversed, and thus, a voltage is generated at the first drive winding so as to turn on the first switching element. Accordingly, a self-excited oscillation operation is performed. Also, a current-continuation mode, in which a current is applied to the secondary side of the transformer and the current is continuously applied to the primary side without a pause, is achieved such that the waveform of the current applied to the first switching element on the primary side is trapezoidal. That is, the operation is performed in a current-continuation mode in which the waveform of the current applied to the first switching element under heavy load is trapezoidal. Thus, the peak current applied to the transformer and the first switching element and the effective current is greatly reduced, copper loss of the transformer and conduction loss of the first switching element is greatly reduced, and thus, a compact, lightweight, and highly efficient switching power supply unit is achieved.

According to a second preferred embodiment of the present invention, a switching power supply unit operating in a current-continuation mode includes a transformer including a primary winding, a secondary winding, a first drive winding, and a second drive winding, an inductor, a first switching circuit including a parallel circuit having a first switching element, a first diode, and a first capacitor, an input power supply, a second switching circuit connected in parallel to the first switching circuit, the second switching circuit including a parallel circuit having a second switching element, a second diode, and a second capacitor, a capacitor connected in parallel to the first switching circuit, a rectifying and smoothing circuit which includes a rectifying element and which is connected to the secondary winding, and first and second switching control circuits for alternately turning on/off the first and second switching elements, with a period when both the first and second switching elements are turned off therebetween, the first switching control circuit being connected between the first drive winding and a control terminal of the first switching element and the second switching control circuit being connected between the second drive winding and a control terminal of the second switching element. The primary winding, the inductor, the first switching circuit, and the input power supply are connected in series.

Energy is stored in the primary winding and the inductor during an ON-period of the first switching element and the energy is emitted from the secondary winding during an OFF-period of the first switching element such that the first and second switching elements perform self-excited oscillation. The inductor and the capacitor define a resonance circuit which resonates during the OFF-period of the first switching element. The first switching control circuit includes a first ON-time control circuit in which a time constant is set such that the first switching element is turned off at a desired time after the first switching element is turned on. The second switching control circuit includes a second ON-time control circuit in which a time constant is set such that the second switching element is turned off in order to interrupt a resonance current applied to a series circuit including the second switching element and the inductor after the second switching element is turned on and before the energy is completely emitted from the secondary winding.

In this configuration, the location for connecting the capacitor is different from that of the first preferred embodiment of the present invention. However, the operation is the same as in the first preferred embodiment, and thus, a compact, lightweight, and highly efficient switching power supply unit is achieved. Further, although the voltage applied to the capacitor is greater than in the first preferred embodiment, the capacitance is reduced when a desired charge is stored. Accordingly, the size of the capacitor is greatly reduced.

According to a third preferred embodiment of the present invention, a switching power supply unit operating in a current-continuation mode includes a transformer including a primary winding, a secondary winding, a first drive winding, and a second drive winding, an inductor, a capacitor, a first switching circuit including a parallel circuit having a first switching element, a first diode, and a first capacitor, an input power supply, a second switching circuit connected in parallel to a series circuit including the primary winding, the inductor, and the capacitor, the second switching circuit including a parallel circuit having a second switching element, a second diode, and a second capacitor, a rectifying and smoothing circuit which includes a rectifying element and which is connected to the secondary winding, and first and second switching control circuits for alternately turning on/off the first and second switching elements, with a period when both the first and second switching elements are turned off therebetween, the first switching control circuit being connected between the first drive winding and a control terminal of the first switching element and the second switching control circuit being connected between the second drive winding and a control terminal of the second switching element. The primary winding, the inductor, the capacitor, the first switching circuit, and the input power supply are connected in series.

Energy is stored in the primary winding and the inductor during an ON-period of the first switching element and the energy is emitted from the secondary winding during an OFF-period of the first switching element so that the first and second switching elements perform self-excited oscillation. The inductor and the capacitor define a resonance circuit which resonates during the OFF-period of the first switching element. The first switching control circuit includes a first ON-time control circuit in which a time constant is set such that the first switching element is turned off at a desired time after the first switching element is turned on. The second switching control circuit includes a second ON-time control circuit in which a time constant is set such that the second switching element is turned off in order to interrupt a resonance current applied to a series circuit including the second switching element and the inductor after the second switching element is turned on and before the energy is completely emitted from the secondary winding.

In this configuration, the location for connecting the capacitor is different from that of the first preferred embodiment of the present invention. However, the operation is the same as in the first preferred embodiment, and thus, a compact, lightweight, and highly efficient switching power supply unit is achieved. Also, in this configuration, the primary side of the transformer has a so-called half-bridge configuration. Therefore, the voltage applied to the first and second switching elements is equal to the input voltage, and thus, the applied voltage decreases as compared to that in the first preferred embodiment of the present invention. In general, the ON-resistance of a low-pressure-resistance switching element is small, and thus, the conduction loss due to the ON-resistance is reduced and high-efficiency is achieved. Also, the voltage applied to the transformer is about one half that of the first preferred embodiment, and thus, the number of windings is reduced so as to achieve a compact and highly efficient transformer.

Also, during the OFF-period of the first switching element, the electrostatic energy stored in the capacitor is emitted as well as the exciting energy stored in the transformer during the ON-time of the first switching element. Accordingly, the peak current applied to the transformer and the switching element is greatly reduced, thus greatly reducing the effective current and conduction loss.

Preferably, the switching power supply unit further includes an overcurrent protection unit including an overcurrent protection circuit which includes a current detecting unit connected in series to the first switching element and which limits an ON-time of the first switching element when the current applied to the first switching element detected by the current detecting unit reaches a threshold.

In this configuration, since the overcurrent protection circuit for detecting the peak current applied to the first switching element and limiting the current is provided, saturation of the transformer and destruction of the switching elements caused by an increase in the peak current during overcurrent and at startup is prevented.

The overcurrent protection circuit includes a third switching unit for turning off the first switching element, the third switching unit being connected to the control terminal of the first switching element, and the overcurrent protection circuit turns on the third switching unit when a peak current applied to the current detecting unit reaches the threshold so as to turn off the first switching element.

With this arrangement, the third switching unit limits the peak current of the first switching element, and thus, the configuration of the overcurrent protection circuit is greatly simplified.

The first switching control circuit includes a first delay circuit which includes a series circuit including a resistor or a resistor and a capacitor and which is connected between the first drive winding and the control terminal of the first switching element. Also, the second switching control circuit includes a second delay circuit which includes a series circuit including a resistor or a resistor and a capacitor and which is connected between the second drive winding and the control terminal of the second switching element. The first delay circuit delays a voltage which is generated at the first drive winding and which turns on the first switching element so as to delay the turn on of the first switching element. Also, the second delay circuit delays a voltage which is generated at the second drive winding and which turns on the second switching element so as to delay the turn on of the second switching element.

By providing the delay circuits, a turn-on timing of the switching elements is delayed, and each of the switching elements are turned on when the voltage applied to the switching element is decreased to zero or close to zero. Accordingly, a zero-voltage switching operation is performed and switching loss is greatly reduced.

Also, in the known art, in which the waveform of the current applied to the first switching element is triangular, turning off the rectifying element on the secondary side is a trigger for the resonation between the inductor and the first and second capacitors and for turning on the first switching element. On the other hand, in the preferred embodiments of the present invention, turning off the second switching element while the energy stored in the inductor is emitted is a trigger for generating a voltage at the primary winding and turning on the first switching element. With this operation, the resonance period when the voltage is reversed is shorter as compared to the circuit in the known art, and thus, the delay time for turning on the first switching element is reduced.

Further, the resistor defining the delay circuit attenuates a voltage surge generated at the drive winding and delays the rise time of the control voltage so as to delay the turn-on time. The voltage at the capacitor is divided with the input capacitance of the switching element such that the voltage applied to the control terminal can be adjusted.

A delay time is set in the first delay circuit such that the first switching element is turned on when a voltage applied across the first switching element is decreased to zero or close to zero, and a delay time is set in the second delay circuit such that the second switching element is turned on when a voltage applied across the second switching element is decreased to zero or close to zero.

With this configuration, the first and second switching elements perform zero-voltage switching by the first or second delay circuit, and thus, switching loss is further reduced.

The first ON-time control circuit includes a first switching unit for turning off the first switching element and turns on the first switching unit so as to turn off the first switching element at a desired time after a voltage for turning on the first switching element is generated at the first drive winding.

Accordingly, the output voltage is stabilized by the first ON-time control circuit including the time-constant circuit for the first switching element.

The second ON-time control circuit includes a second switching unit for turning off the second switching element and turns on the second switching unit in order to turn off the second switching element after a voltage for turning on the second switching element is generated at the second drive winding and before the energy is completely emitted from the secondary winding, whereby a current applied to the series circuit including the second switching element and the inductor is interrupted.

With this arrangement, the second ON-time control circuit including the time-constant circuit for the second switching element turns off the second switching element before the energy is completely emitted from the secondary winding of the transformer. This is a trigger for reversing the voltage generated at the transformer and generating a voltage at the first drive winding, and the first switching element is turned on with this voltage such that the first switching element performs self-excited oscillation.

Accordingly, as described above, the waveform of the current applied to the first switching element is trapezoidal and the current-continuation mode is performed.

Values of the inductor and the capacitor are set such that a resonance current applied to the inductor and the capacitor reaches a peak when a current applied to the inductor is interrupted by turning off the second switching element by the second switching control circuit.

In this configuration, by turning off the second switching element when the resonance current is close to its peak, the capacitance of the capacitor is reduced and miniaturization of the capacitor is achieved.

Also, with the resonance current applied to the inductor and the capacitor, the waveform of the current applied to the rectifying element on the secondary side is an upward sine-wave. Accordingly, the peak current is reduced and the effective current is reduced.

Further, by turning off the second switching element after the resonance current reaches the peak current, the turn-off current of the rectifying element on the secondary side is reduced. Accordingly, recovery loss of the diode is reduced.

The first ON-time control circuit includes a circuit for varying a time until the first switching element is turned off according to a signal corresponding to an output voltage.

In this configuration, the time until the first switching element is turned off is shortened under light load according to a signal corresponding to the output power, and the time until the first switching element is turned off is increased under heavy load. Accordingly, the output voltage is stabilized.

Preferably, the third switching unit includes a transistor connected to the control terminal of the first switching element, the voltage generated at the current detecting unit is applied to a control terminal of the transistor through a resistor, the transistor is turned on when the current applied to the first switching element reaches a desired value and the voltage at the control terminal of the transistor reaches a threshold, and the first switching element is turned off so as to limit the peak current applied to the first switching element.

By defining the third switching unit by the transistor, the divided voltage of the voltage generated at the current detecting unit is compared with a threshold of the transistor (base-emitter voltage: about 0.6 V). Accordingly, the peak current of the first switching element is limited, the number of components is reduced which results in a simplified configuration. Also, a low cost, compact, and lightweight switching power supply unit is achieved.

The voltage generated at the first drive winding during the ON-period of the first switching element is input to the control terminal of the transistor through a resistor and a diode.

When the input voltage varies, if the peak current is constant, the overcurrnet point increases as the input voltage increases. At this time, by inputting the voltage which is generated at the first drive winding and which is proportional to the input voltage to the control terminal of the third switching unit through the resistor and the diode, the overcurrent point is lowered only when the input voltage is high, and thus, the variation in the overcurrent point due to the variation in the input voltage is suppressed. That is, the third switching unit is turned on earlier when the input voltage is high. This contributes to achieving a compact and lightweight switching power supply unit.

The overcurrent protection unit includes a first ON-time limiting unit for defining the maximum ON-time of the first switching element and a second ON-time limiting unit for turning off the first switching element when the current applied to the first switching element reaches a desired value, the first and second ON-time limiting units being independent from each other.

The peak current is limited by the second ON-time limiting unit when overcurrent occurs, and the maximum ON-time of the first switching element is reduced by the first ON-time limiting unit when the output voltage decreases. Accordingly, an increase in the output current on the secondary side is suppressed, and a short-circuit current is reduced.

Preferably, at least one of the first switching element and the second switching element includes a field-effect transistor.

With this arrangement, the parasitic capacitance of the field-effect transistor is used as the first capacitor or the second capacitor. Also, a parasitic diode of the field-effect transistor is used as the first diode or the second diode. Accordingly, the number of components is greatly reduced, and a low-cost, compact, and lightweight switching power supply unit is achieved.

Preferably, the inductor includes a leakage inductor included in the transformer.

By using a leakage inductor included in the transformer as the indictor, the number of components is further reduced, and a low-cost, compact, and lightweight switching power supply unit is achieved.

Further, a capacitive impedance is preferably connected across the rectifying element.

By connecting a capacitive impedance across the rectifying element on the secondary side, the recovery loss of the rectifying element is greatly reduced, and thus, a high-efficiency and low EMI noise are achieved.

Other feature, elements, characteristics and advantages of the present invention will become more apparent from the following detailed description of preferred embodiments of the present invention with reference to the attached drawings.

BRIEF DESCRIPTION OF THE DRAWINGS

FIGS. 7A to 7D show variation in the current Id1 and the exciting current Im according to a variation in load.

DESCRIPTION OF THE PREFERRED EMBODIMENTS

Figure 1:
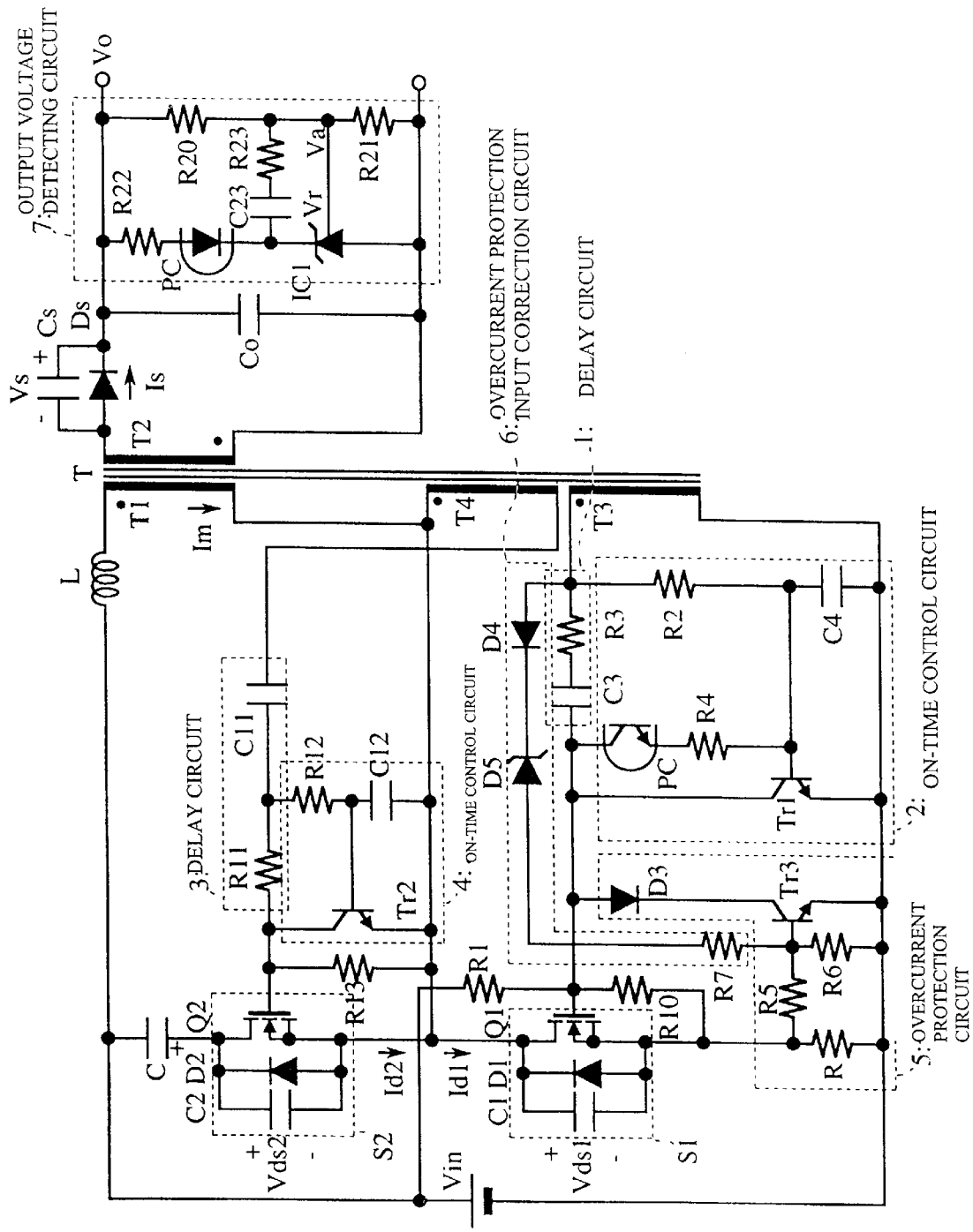
FIG. 1 is a circuit diagram of a switching power supply unit according to a first preferred embodiment of the present invention.

FIG. 1 is a circuit diagram of a switching power supply unit according to a first preferred embodiment of the present invention. On the primary side of a transformer T, a first switching circuit S1 and an input power supply Vin are connected in series to a series circuit including a primary winding T1 and an inductor L, and a series circuit including a second switching circuit S2 and a capacitor C is connected in parallel to the series circuit including the primary winding T1 and the inductor L. Also, a rectifying and smoothing circuit including a rectifying element Ds is connected to a secondary winding T2 of the transformer T.

The first switching circuit S1 includes a parallel circuit having a first switching element Q1, a first diode D1, and a first capacitor C1. The second switching circuit S2 also includes a parallel circuit having a second switching element Q2, a second diode D2, and a second capacitor C2.

The transformer T is provided with a first drive winding T3 and a second drive winding T4. A first switching control circuit is connected between the first drive winding T3 and a control terminal of the first switching element Q1, and a second switching control circuit is connected between the second drive winding T4 and a control terminal of the second switching element Q2. The first and second switching control circuits control the first and second switching elements Q1 and Q2 such that the switching elements Q1 and Q2 are alternately turned on/off with a period when both switching elements are turned off therebetween. Energy is stored in the primary winding T1 and the inductor L during an ON-period of the first switching element Q1, and the energy is emitted from the secondary winding T2 during an OFF-period of the first switching element Q1. Accordingly, the first switching element Q1 and the second switching element Q2 perform self-excited oscillation.

The first switching control circuit preferably includes a delay circuit 1 and an ON-time control circuit 2.

The delay circuit 1 includes a series circuit having a resistor R3 and a capacitor C3, and delays the voltage generated at the first drive winding T3 and applies the voltage to the control terminal of the first switching element Q1. The delay time set in the delay circuit 1 is from when a voltage is generated at the first drive winding T3 until the charge for the capacitor C1 applied across the first switching element Q1 in an OFF-state is decreased to zerovolts or close to zerovolts. Accordingly, the first switching element Q1 is tuned on when the voltage which is applied across thereof is decreased to zero or close to zero.

The ON-time control circuit 2 includes a transistor Tr1, which is a first switching unit connected between the control terminal of the first switching element Q1 and a reference-potential (negative pole) terminal of the input power supply Vin, a time-constant circuit which includes a resistor R2 and a capacitor C4 and which is connected to a control terminal of the transistor Tr1, and a series circuit which includes a resistor R4 and a phototransistor of a photocoupler PC and which is connected between the control terminal of the transistor Tr1 and the control terminal of the first switching element Q1. The time-constant circuit including the resistor R2 and the capacitor C4 is connected to the first drive winding T3, and turns on the transistor Tr1 so as to turn off the first switching element Q1 at a desired time after a voltage is generated at the first drive winding T3. Further, the series circuit including the phototransistor and the resistor R4 controls the ON-time of the transistor Tr1 based on a signal from an output-voltage detecting circuit, which will be described later, so as to stabilize the output voltage Vo.

The second switching control circuit includes a delay circuit 3 and an ON-time control circuit 4.

The delay circuit 3 delays the voltage generated at the second drive winding T4 and applies the voltage to the control terminal of the second switching element Q2. The delay time set in the delay circuit 3 is, as in the delay circuit 1, from when a voltage is generated at the second drive winding T4 until the voltage applied across the second switching element Q2 is decreased to zero or close to zero. Accordingly, the second switching element Q2 also performs zero-voltage switching. Also, the ON-time control circuit 4 includes a transistor Tr2, which is a second switching unit connected to the control terminal of the second switching element Q2, and a time-constant circuit which includes a resistor R12 and a capacitor C12 and which is connected to the control terminal of the transistor Tr2. The time-constant circuit including the resistor R12 and the capacitor C12 turns on the transistor, Tr2 so as to turn off the second switching element Q2 at a desired time after a voltage is generated at the second drive winding T4. Further, in the time-constant circuit including the series circuit having the resistor R12 and the capacitor C12, a time constant is set such that a current applied to the series circuit including the second switching element Q2 and the inductor L is forced to be interrupted so as to turn off the second switching element Q2 after a voltage is generated at the second drive winding T4 and the second switching element Q2 is turned on and before energy is completely emitted from the secondary winding T2.

An overcurrent protection circuit 5, which includes a resistor R for detecting the amount of current Id1 applied to the first switching element Q1, is connected to the first switching element Q1. The overcurrent protection circuit 5 includes the resistor R for detecting the amount of current Id1, resistors R5 and R6, a transistor Tr3 having a base terminal to which the voltage across the resistor R is input through the resistors R5 and R6, and a diode D3 connected between a collector terminal of the transistor Tr3 and the control terminal of the first switching element Q1. In the overcurrent protection circuit 5, a voltage corresponding to the amount of current Id1 applied to the resistor R is divided by the resistors R5 and R6 such that the divided voltage is supplied to the base-emitter of the transistor Tr3. When the voltage surpasses a threshold Vbe (about 0.6 V), the transistor Tr3 is turned on and the first switching element Q1 is turned off. Accordingly, a peak current Idp applied to the primary winding T1 and the first switching element Q1 is limited to a desired value such that saturation of the transformer caused by overcurrent is prevented.

When overcurrent occurs, overcurrent protection is also performed by the ON-time control circuit 2 including the time-constant circuit having the resistor R2 and the capacitor C4. As will be described later, in an operation mode in which the output voltage is stabilized, when the output current Io from the secondary winding T2 increases such that the peak of the current Id1 applied to the first switching element Q1 surpasses a desired value, the overcurrent protection circuit 5 operates to limit the peak current. However, when the output current Io further increases, the operation mode is changed to a dropping characteristic mode in which the output voltage decreases while the output power is kept constant. At this time, the time-constant circuit of the ON-time control circuit 2 brings forward the ON-timing of the transistor Tr1, as described in detail later, such that the maximum ON-time of the first switching element Q1 is reduced. Accordingly, during overcurrent, the peak current is limited by the overcurrent protection circuit 5 and the maximum ON-time of the first switching element Q1 is defined by the ON-time control circuit 2. As a result, saturation of the transformer is prevented, an increase in the output current on the secondary side is suppressed, and a short-circuit current is reduced.

In this preferred embodiment, the overcurrent protection circuit 5 is a second ON-time limiting unit of the present invention and the ON-time control circuit 2 is a first ON-time limiting unit of this invention. Accordingly, the overcurrent protection circuit 5 and the ON-time control circuit 2 define an overcurrent protection unit.

An overcurrent protection input correction circuit 6 is connected to the overcurrent protection circuit 5. In preferred embodiments of the present invention, the overcurrent protection input correction circuit 6 is a portion of the overcurrent protection unit.

The overcurrent protection input correction circuit 6 is connected between the first drive winding T3 and the base terminal of the transistor Tr3 of the overcurrent protection circuit 5 and includes a series circuit having a diode D4, a Zener diode D5, and a resistor R7. The overcurrent protection input correction circuit 6 corrects the output current for the overcurrent protection circuit 5 when the input voltage varies. That is, since the voltage generated at the first drive winding T3 is high when the input voltage is high, the operating point of the overcurrent protection circuit 5 is lowered by applying a current to the base terminal of the transistor Tr3 through the correction circuit 6. With this arrangement, the operating point of the overcurrent protection circuit 5 is maintained substantially constant even when the input voltage varies.

An output-voltage detecting circuit 7 for detecting the output voltage Vo is provided on the output side of the secondary winding T2 of the transformer T.

The output-voltage detecting circuit 7 includes voltage-dividing resistors R20 and R21 for dividing the output voltage Vo, a shunt regulator IC1, the junction of the resistors (reference point) being connected to an input terminal of a reference voltage Vr, and a photodiode of a photocoupler PC connected in series to the shunt regulator IC1. The shunt regulator IC1 compares the reference voltage Vr with the divided voltage Va divided by the voltage-dividing resistors R20 and R21 and controls the cathode-anode current according to the difference. The photocoupler PC converts the change in current to a change in light intensity. That is, when the output voltage Vo increases, the collector-emitter impedance of the phototransistor of the ON-time control circuit 2 decreases. Accordingly, the charging time for the capacitor C4 is reduced during the ON-time of the first switching element Q1, the transistor Tr1 is turned on earlier, and the turn-off timing of the first switching element Q1 is brought forward such that the ON-time is reduced. By reducing the ON-time of the first switching element Q1, the output current is reduced and the output voltage Vo decreases. When the output voltage Vo decreases below a desired voltage (set voltage), the output power increases by the operation opposite to the above-described operation such that the output voltage increases. In this manner, control for stabilizing the output voltage is performed.

Next, the operation of the above-described switching power supply unit will be described.

Figure 2:
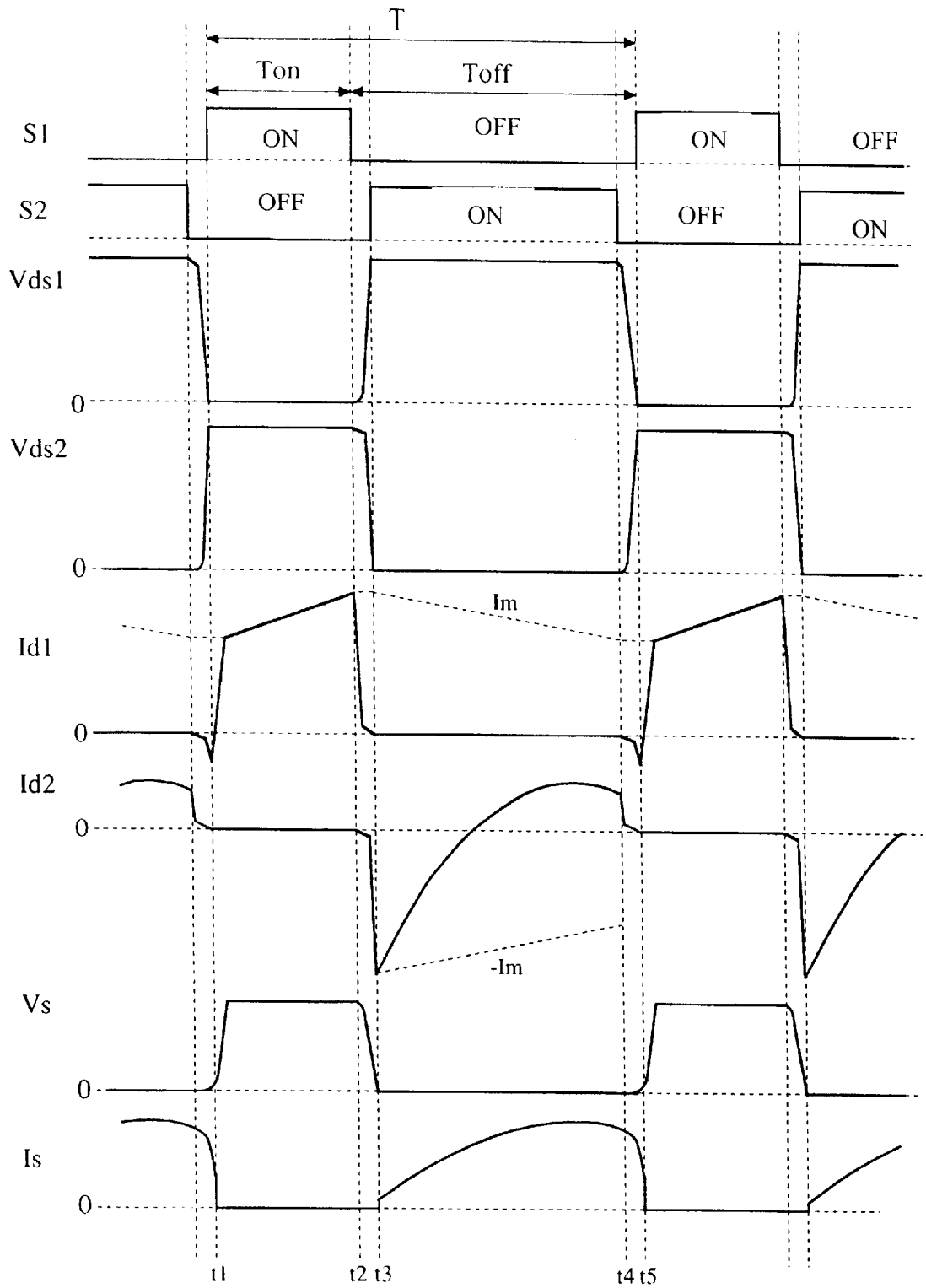
FIG. 2 shows operation waveforms of the switching power supply unit of FIG. 1.

FIG. 2 shows the waveforms of the circuits shown in FIG. 1. Hereinafter, the operation of the circuits will be described in detail with reference to FIGS. 1 and 2.

In FIG. 2, S1 and S2 are signals indicating the ON/OFF state of the first and second switching elements Q1 and Q2, respectively, Vds1, Vds2, and Vs are waveforms of the voltages across the capacitors C1, C2, and Cs, respectively, and Id1, Id2, and Is are waveforms of the currents in the switching circuits S1 and S2 and the rectifying element Ds, respectively.

The switching operation of the circuit in the optimal steady state is divided into four operation states at times t1 to t5 in one switching period T. Hereinafter, the operation in each state will be described.

State 1: t1 to t2

The first switching element Q1 is ON. The input voltage is applied to the primary winding T1 of the transformer T such that the current in the primary winding T1 increases linearly. At this time, exciting energy is stored in the transformer T. Also, the capacitor C4 is charged through the photocoupler PC. When the voltage at the capacitor C4 reaches the threshold voltage of the transistor Tr1 (about 0.6 V), the transistor Tr1 is turned on and the first switching element Q1 is turned off at time t2 so as to proceed to state 2.

State 2: t2 to t3

When the first switching element Q1 is turned off, the primary winding T1 of the transformer T and the inductor L resonate with the capacitors C1 and C2 so as to charge the capacitor C1 and to allow the capacitor C2 to discharge. On the secondary side, the secondary winding T2 of the transformer T resonates with the capacitor Cs such that the capacitor Cs discharges. The curves of the leading edge of the voltage Vds1 and the trailing edge of the voltage Vds2 are portions of a sine-wave generated by the resonance between the primary winding T1 and the inductor L and the capacitors C1 and C2. When the voltage Vds2 across the capacitor C2 decreases to zero, the diode D2 conducts so as to proceed to state 3.

At this time, on the secondary side, the voltage Vs across the capacitor Cs decreases to zero, the rectifying element Ds conducts, and a zero-voltage turn-on operation is performed. The curve of the trailing edge of the voltage Vs is a portion of a sine-wave generated by the resonance between the capacitor Cs and the secondary winding T2.

State 3: t3 to t4

While the diode D2 is conducting, the delay circuit 3 including the capacitor 11 and the resistor R11 delays the voltage generated at the second drive winding T4 and the voltage is then applied to the control terminal of the second switching element Q2 so that the second switching element Q2 is turned on. Accordingly, the second switching element Q2 performs a zero-voltage switching operation. In state 3, the diode D2 and the second switching element Q2 are conducting on the primary side, the inductor L and the capacitor C start to resonate, and the capacitor C discharges.

At this time, on the secondary side, the rectifying element Ds is conducting, and the exciting energy stored in the transformer T is emitted from the secondary winding T2 and is output through the rectifying and smoothing circuit. In this state, the current Is applied to the rectifying element Ds has a waveform similar to a combination of the waveforms of the resonance current Id2 generated by the inductor L and the capacitor C on the primary side and the exciting current Im which linearly decreases. Thus, the current Is has a waveform including a sine-wave curve, which rises relatively rapidly from zero.

On the primary side, the capacitor C12 charges through the resistor R12 with the voltage generated at the second drive winding T4. When the charging voltage reaches the threshold voltage of the transistor Tr2 (about 0.6 V), the transistor Tr2 is turned on which causes the resonance current applied to the second switching element Q2 to be interrupted. The value of the resonance current which is interrupted at that time, which is time t4, is close to the peak. In the time-constant circuit including the resistor R12 and the capacitor C12 of the ON-time control circuit 4, the time constant is set so as to turn off the switching element Q2 at time t4.

State 4: t4 to t5

When the second switching element Q2 is turned off, the resonance current Id2 is suddenly interrupted. By this sudden change in the current, a voltage is generated at the inductor L such that the voltage at the primary winding T1 of the transformer T is reversed. The inductor L resonates with the capacitors C1 and C2. Also, the capacitor C1 is discharged and the capacitor C2 is charged by the exciting energy of the inductor L. When the voltage Vds1 across the capacitor C1 decreases and reaches zero at time t5, the diode D1 conducts and state 4 ends. While the diode D1 is conducting, the delay circuit 1 including the resistor R3 and the capacitor C3 delays the voltage generated at the first drive winding T3 and the voltage is then applied to the control terminal of the first switching element Q1. Accordingly, the first switching element Q1 is turned on so as to perform a zero-voltage switching operation.

On the secondary side, when the switching element Q2 is turned off, the rectifying element Ds is turned off and the voltage Vs across the capacitor Cs increases from zero such that the voltage Vs is clamped by the sum of the secondary winding voltage and the output voltage.

The foregoing operation is performed in one switching period, and thus, the operation is performed repeatedly.

Comparison with the Known Circuit

Figure 3:
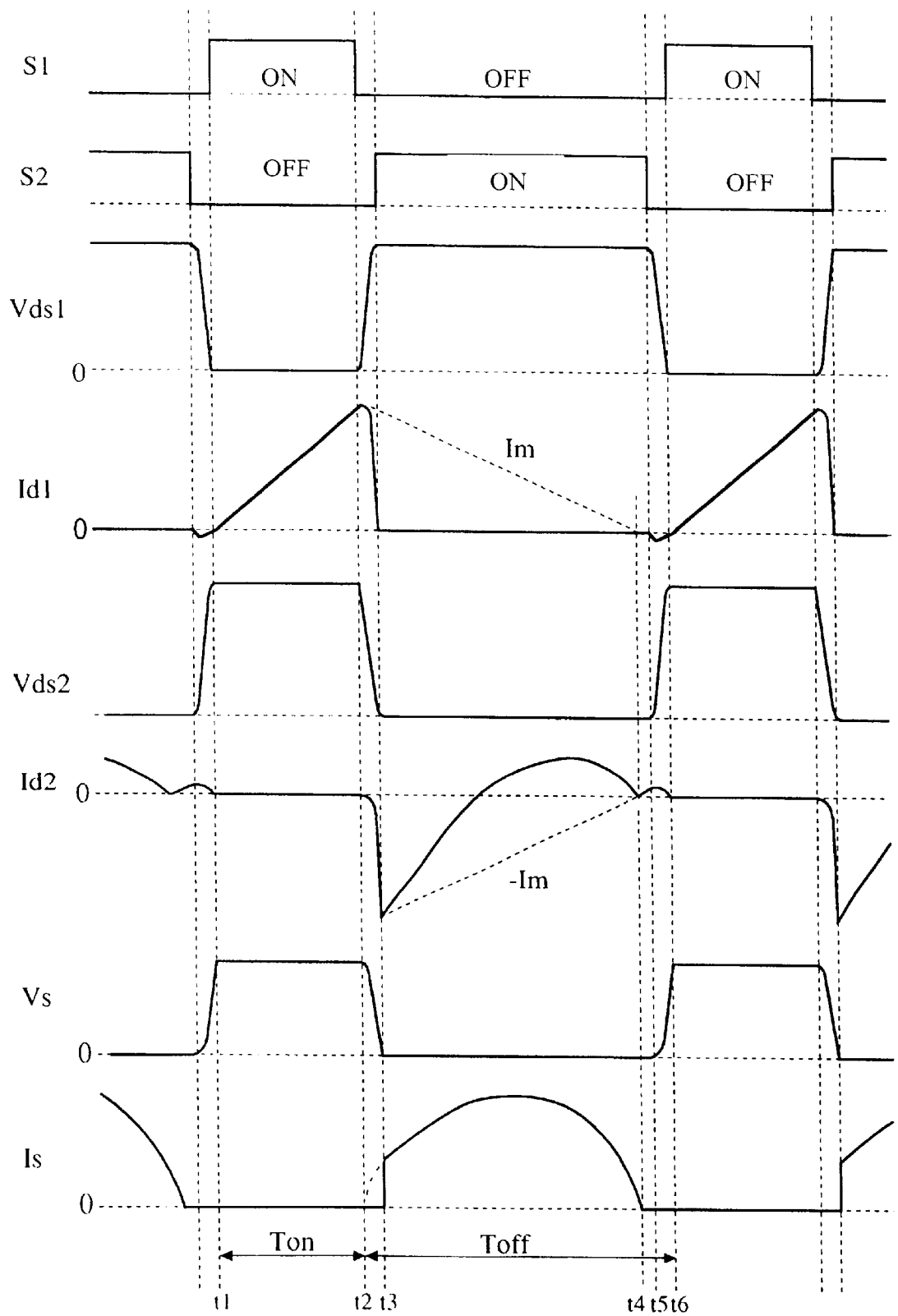
FIG. 3 shows operation waveforms of a known switching power supply unit of FIG. 1.

FIG. 3 shows the operation waveforms of a known switching power supply unit disclosed in Japanese Unexamined Patent Application Publication No. 11-187664.

In the known switching power supply unit, at time t4 when the second switching element Q2 is turned off, the resonance current Id2 is reduced to close to zero. On the other hand, in the first preferred embodiment of the present invention, at time t4 when the second switching element Q2 is turned off, the resonance current Id2 is close to the peak current.

That is, in the known switching power supply unit, the second switching element Q2 is turned off after the exciting energy stored during the ON-period of the first switching element Q1 is completely emitted. Then, the rectifying element Ds is turned off and a reverse voltage is generated across the diode, and thus the voltage of the transformer T is reversed and a positive voltage is generated at the first drive winding T3. Accordingly, the first switching element Q1 is turned on.

On the other hand, in the switching power supply unit of the first preferred embodiment, the second switching element Q2 is turned off before the exciting energy stored during the ON-period of the first switching element Q1 is completely emitted to the secondary side. Accordingly, the first switching element Q1 is turned on by the voltage generated at the first drive winding T3. Then, when the first switching element Q1 is turned on, a reverse voltage is generated across the rectifying element Ds on the secondary side so that the rectifying element Ds is turned off.

As described above, in the known switching power supply unit, turning off the rectifying element Ds on the secondary side after emission of the exciting energy is a trigger for turning on the first switching element Q1. In contrast, in the switching power supply unit of the first preferred embodiment, turning off the second switching element Q2 with the ON-time control circuit 4 while the exciting energy is being emitted is a trigger for turning on the first switching element Q1.

Also, in the switching power supply unit of the first preferred embodiment of the present invention, the time constant of the ON-time control circuit 4 is set such that the second switching element Q2 is turned off while the exciting energy is being emitted. Therefore, the switching power supply unit of the first preferred embodiment is fundamentally different from the known switching power supply unit in the time constant set in the ON-time control circuit 4.

Figure 4A:
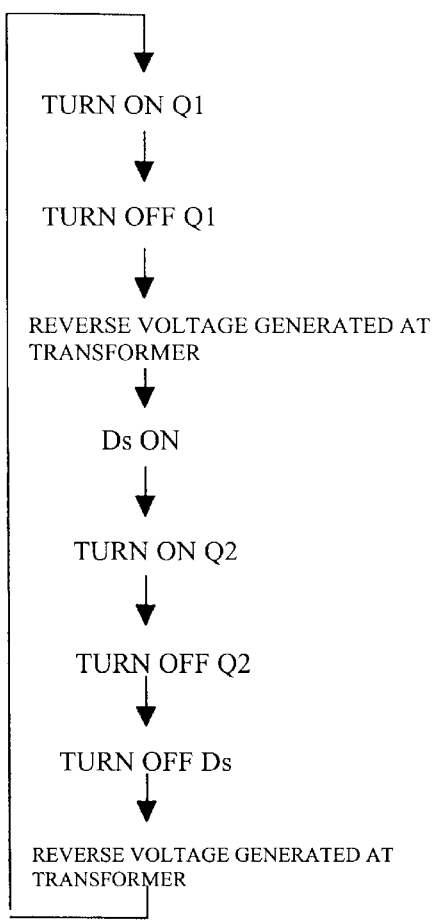
FIGS. 4A and 4B show the ON/OFF sequence of switching elements of the known switching power supply unit and the switching power supply unit of the first preferred embodiment.
Figure 4B:
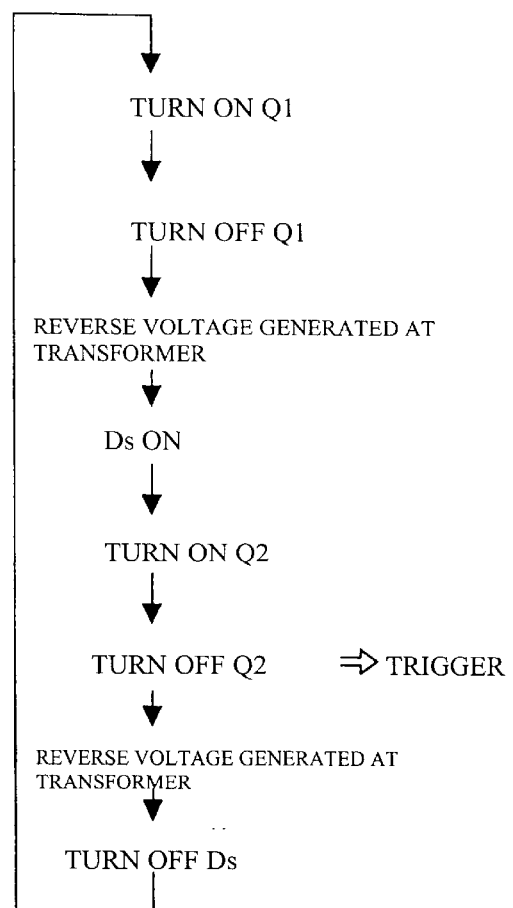

FIGS. 4A and 4B show the ON/OFF sequence of the switching elements Q1 and Q2 and the rectifying element Ds. FIG. 4A corresponds to the known device and FIG. 4B corresponds to the device of the first preferred embodiment.

As shown in the figures, in the known device, when a reverse voltage is generated at the rectifying element Ds and the rectifying element Ds is turned off, the voltage generated at the transformer is reversed and the first switching element Q1 is turned on. On the other hand, in the device of the first preferred embodiment, turning off the second switching element Q2 with the ON-time control circuit 4 is a trigger for reversing the voltage generated at the transformer and turning on the first switching element Q1. As shown in FIGS. 4A and 4B, it is clear that the ON/OFF operation modes of the switching elements Q1 and Q2 in the known device and the device of the first preferred embodiment differ from each other.

Operation for Stabilizing Output Voltage

The operation for stabilizing the output voltage Vo is the same as in the known device.

In a steady-state operation, the voltage Va generated by dividing the output voltage Vo by the resistors R20 and R21 is compared with the reference voltage Vr of the shunt regulator IC1. In this state, when the output voltage Vo increases to surpass the set voltage, the divided voltage Va becomes higher than the reference voltage Vr, the cathode potential of the shunt regulator IC1 decreases, and thus, the photodiode of the photocoupler PC conducts. Accordingly, the collector-emitter impedance of the phototransistor provided in the ON-time control circuit 2 decreases. As a result, the charging time for the capacitor C4 is reduced during the ON-period of the first switching element Q1 and the ON-timing of the transistor Tr1 is brought forward. Thus, the turn-off timing of the first switching element Q1 is also brought forward. Accordingly, the ON-time of the first switching element Q1 is reduced, and thus, the output power is reduced and the output voltage decreases.

When the output voltage Vo decreases below the set voltage, the opposite operation is performed. That is, when the collector-emitter impedance of the phototransistor increases such that the ON-timing of the transistor Tr1 becomes later, the ON-time of the first switching element Q1 increases and thus, the output power and the output voltage increase.

Due to the above-described operation, the output voltage Vo is stabilized by the set voltage. The output voltage Vo at this time is represented by the following expression.

$$Vo=Vr\times(R20+R21)/R21$$

Operation of Overcurrent Protection Unit

Now, the operation of the overcurrent protection circuit 5 and the overcurrent protection input correction circuit 6 during overcurrent and at startup will be described.

When the output power increases and the peak current applied to the primary winding T1 increases, the overcurrent protection circuit 5 operates to prevent saturation of the transformer T. Referring to FIG. 1, when a current is applied to the resistor R, the voltage across the resistor R is divided by the resistors R5 and R6, and is then supplied to the base-emitter of the transistor Tr3. At this time, if the current applied to the resistor R increases and the voltage across the resistor R increases such that the base-emitter voltage of the transistor Tr3 surpasses the threshold Vbe (about 0.6 V), the transistor Tr3 is turned on and the first switching element Q1 is turned off. Accordingly, the peak current applied to the primary winding T1 is limited, and thus, saturation of the transformer T is prevented.

When the output current further increases after the peak current starts to be limited, the output voltage is decreased such that the output power Po is kept at a maximum. Then, when the output current reaches the maximum, the ON-time control circuit 2 operates so as to reduce the maximum ON-time of the switching element Q1. The capacitor C4 of the ON-time control circuit 2 is charged with the voltage of the first drive winding T3, which generates a voltage proportional to the voltage at the primary winding T1, during the period when energy is stored in the primary winding T1 and the inductor L. Also, during the period when the energy is emitted from the secondary winding T2, the capacitor C4 is discharged by the reverse voltage of the first drive winding T3, which generates a reverse voltage proportional to the voltage at the secondary winding T2. The charge for the capacitor C4 does not increase in a steady state, because the charging and discharging cycle is repeated. However, when the output voltage Vo decreases to a certain point, the capacitor C4 cannot be completely discharged by the reverse voltage generated at the first drive winding T3, and thus, the charge for the capacitor C4 increases. Accordingly, the ON-timing of the transistor Tr1 is brought forward, and as a result, the maximum ON-time of the first switching element Q1 is reduced. The maximum ON-time decreases as the output voltage Vo decreases. By this operation, the output current does not increase to surpass the maximum output current, and an operation mode in which both the output current and the output voltage decrease begins. When this operation mode continues, the first switching element Q1 cannot be turned on by the voltage generated at the first drive winding T3. Accordingly, an oscillation mode in which startup and stop are repeated while the ON-time is limited begins, and the output power greatly decreases.

Figure 5:
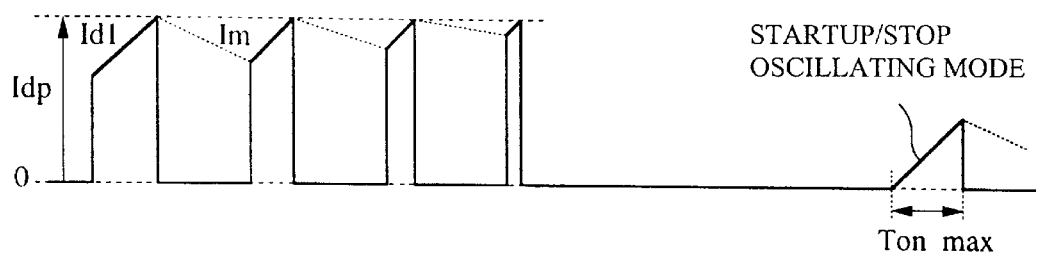
FIG. 5 shows variation in a current Id1 and an exciting current Im during overcurrent.

FIG. 5 shows a variation in the current Id1 and the exciting current Im when the ON-time control circuit 2 starts to operate to limit the maximum ON-time of the first switching element Q1 during overcurrent. The peak current Idp applied to the primary winding T1 is limited by the overcurrent protection circuit 5. Also, the ON-time of the first switching element Q1 is gradually reduced by the control performed by the ON-time control circuit 2, and finally the mode changes to a startup/stop oscillation mode.

Figure 6:
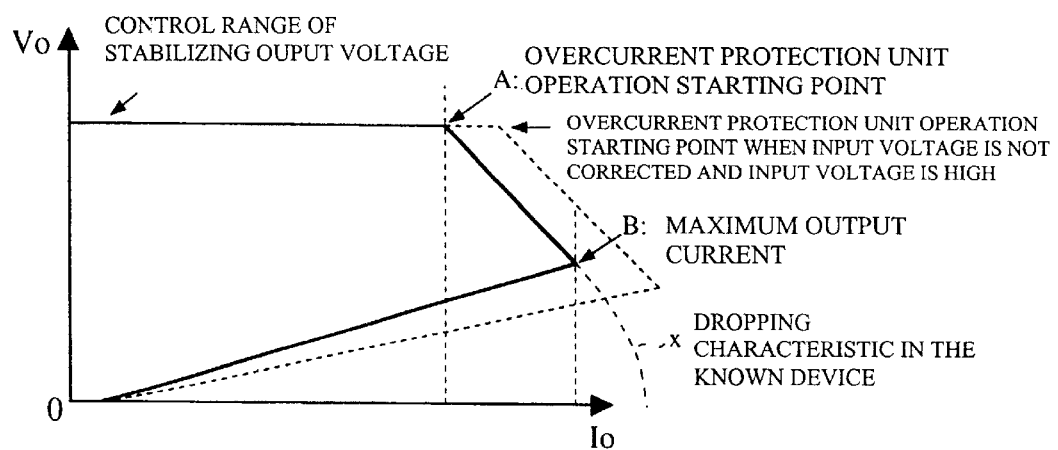
FIG. 6 shows an overcurrent protection unit characteristic.

FIG. 6 shows the characteristic of the overcurrent protection unit obtained from the current peak limiting operation by the overcurrent protection circuit 5 and from the maximum ON-time limiting operation by the ON-time control circuit 2. In FIG. 6, when the output current Io reaches an overcurrent protection unit operation starting point A, the output voltage Vo is decreased in accordance with an increase in the output current Io while the output power Po is kept at a maximum, by the operation of the overcurrent protection circuit 5, as shown in FIG. 5. When the output current Io reaches a maximum output current point B, the ON-time control circuit 2 becomes dominant so as to reduce the maximum ON-time (Ton max) of the first switching element Q1, as shown in FIG. 5. In this mode, the output current Io decreases together with the output voltage Vo. A characteristic indicated by X represents the characteristic (dropping characteristic) of the overcurrent protection unit in the known switching power supply unit. In the overcurrent protection unit characteristic in this preferred embodiment, the current and voltage are controlled to be decreased when the output current Io reaches the maximum. Thus, an increase in the output current Io on the secondary side is suppressed, and a short-circuit current during short-circuit is reduced.

The peak current IdP applied to the primary winding T1 is represented by the following expression.

$$Idp=Vbe\cdot(R5+R6)/R6/R$$

The overcurrent protection input correction circuit 6 corrects the output current for the overcurrent protection circuit 5 when the input voltage varies. That is, when the input voltage is high, the voltage generated at the first drive winding T3 is also high. Thus, the voltage is applied to the base terminal of the transistor Tr3 through the diode D4, the Zener diode D5, and the resistor R7 such that the transistor Tr3 is turned on early. That is, the operating point of the overcurrent protection circuit 5 is reduced. Accordingly, the operating point of the overcurrent protection circuit 5 is substantially constant with respect to variations in the input voltage.

Referring back to FIG. 2, the second switching element Q2 is turned off when the resonance current Id2 is close to its peak, that is, before the exciting current Im reaches a value close to zero. Then, the first switching element Q1 is turned on. Thus, the waveform of the current Id1 is trapezoidal. Also, in a steady state, since the ON-time of the second switching element Q2 is controlled to be substantially constant, the ON-time of the first switching element Q1 is also controlled to be substantially constant, and thus, the switching frequency is also substantially constant. Further, since the waveform of the current Id1 is trapezoidal, the same output power is obtained with a low peak current as compared to the known device in which the corresponding waveform is triangular. Thus, the transformer T is miniaturized, and a compact, lightweight, and highly efficient device is achieved.

FIGS. 7A to 7D show the variation in the current Id1 of the first switching element Q1 and the exciting current Im according to a variation in load.

FIG. 7A shows an operation mode in which the switching frequency slightly varies according to a variation in load. In this operation mode, the current Id1 has a trapezoidal waveform under heavy load. Also, under light load, a circulating current for circulating a portion of the energy stored in the inductor L and the primary winding T1 to the input side is generated.

FIG. 7B shows waveforms of the currents when the switching frequency is constant. Also, FIG. 7C shows waveforms of the currents when the circulating current is reduced under light load. In FIGS. 7A to 7C, the current Id1 has a trapezoidal waveform under heavy load. These operation modes are set by setting the constant number of the delay circuits 1 and 3 and the ON-time control circuits 2 and 4.

Figure 8:
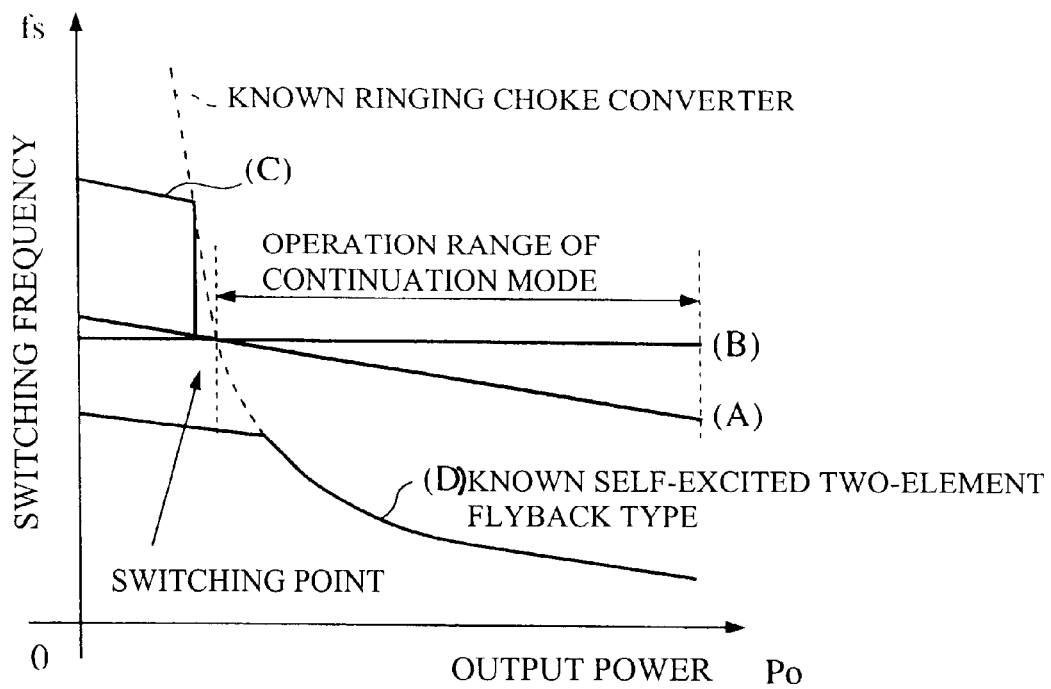
FIG. 8 shows variation in the switching frequency with respect to the output voltage in each mode shown in FIGS. 7A to 7D.

FIG. 7D shows the waveform of the current Id1 in the known art. In the operation mode in the known art, the waveform of the current Id1 is triangular even under heavy load. FIG. 8 shows the relationship between the output power and the switching frequency in each mode shown in FIGS. 7A to 7D. (A) to (D) in FIG. 8 correspond to FIGS. 7A to 7D. (C) in FIG. 8 shows an example in which the circulating current is reduced by shortening the ON-time of the second switching element Q2 at a switching point under light load where the output current is low, as shown in FIG. 7C.

In each operation mode of the first preferred embodiment of the present invention shown in FIGS. 7A to 7C, the switching frequency is substantially constant under medium load and heavy load of the output power Po. On the other hand, in a known ringing choke converter or a self-excited two-element flyback converter, the switching frequency is not constant under medium load and heavy load and decreases as the output power Po increases. As can be seen in FIG. 8, reduction in the switching frequency is suppressed in the first preferred embodiment. As a result, the transformer T and the smoothing circuit are miniaturized, and thus, the entire switching power supply unit is miniaturized.

Hereinafter, other preferred embodiments of the present invention will be described.

Figure 9:
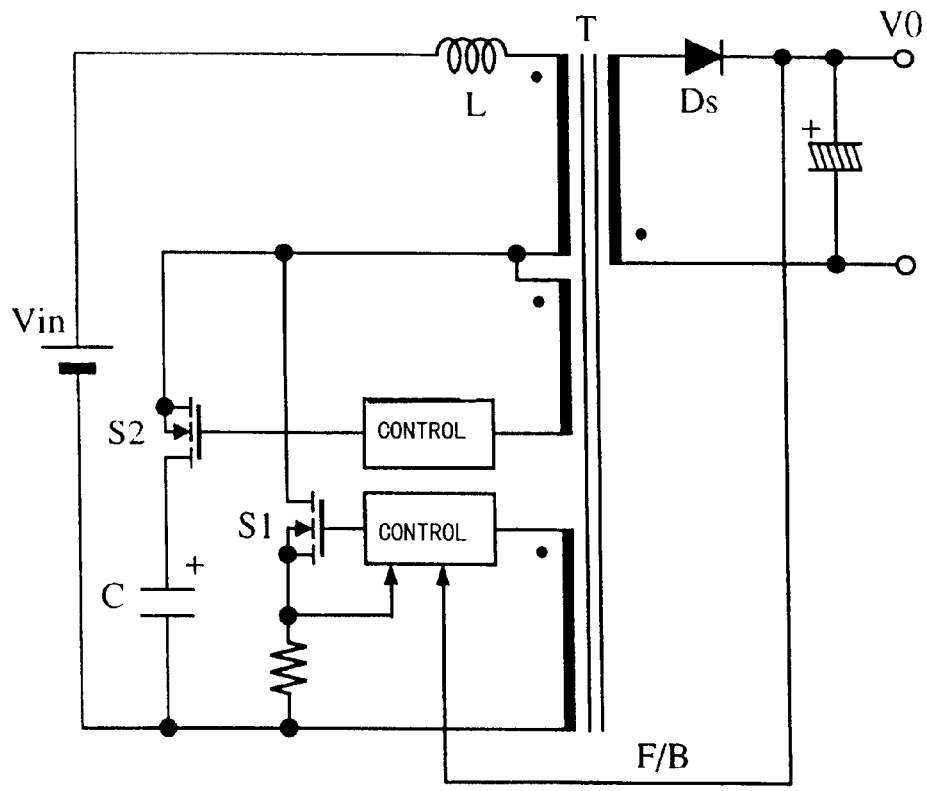
FIG. 9 shows a schematic configuration of a switching power supply unit according to a second preferred embodiment of the present invention.

FIG. 9 shows a schematic configuration of a switching power supply unit according to a second preferred embodiment of the present invention.

In the second preferred embodiment, the primary winding T1 of the transformer T, the inductor L, the first switching circuit S1, and the input power supply Vin are connected in series. Also, a series circuit including the second switching circuit S2 and the capacitor C is connected in parallel to the first switching circuit S1.

In this circuit configuration, the voltage applied to the capacitor C is greater than in the first preferred embodiment. However, the capacitance is reduced when a certain charge is stored, and thus, a compact and lightweight capacitor C is achieved.

Figure 10:
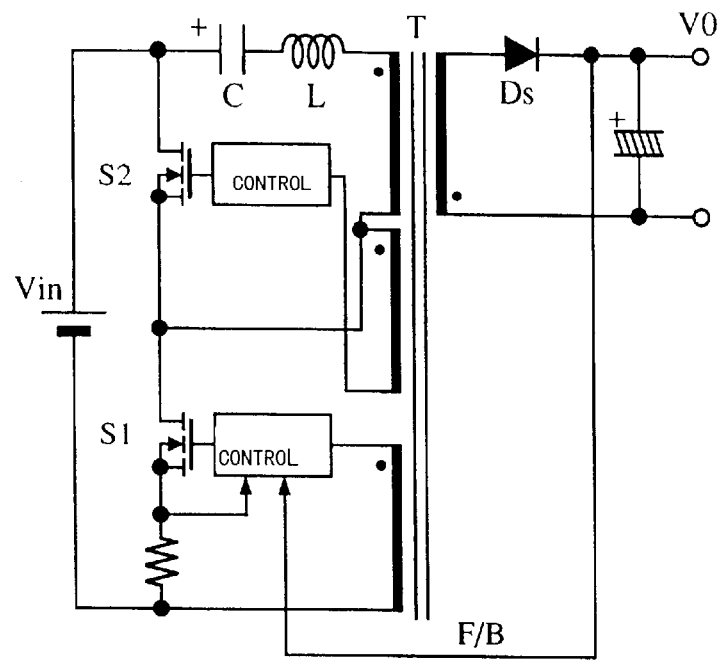
FIG. 10 shows a schematic configuration of a switching power supply unit according to a third preferred embodiment of the present invention.

FIG. 10 shows a schematic configuration of a switching power supply unit according to a third preferred embodiment of the present invention.

In the third preferred embodiment, the primary winding T1 of the transformer T, the inductor L, the capacitor C, the first switching circuit S1, and the input power supply Vin are connected in series. Also, the second switching circuit S2 is connected in parallel to a series circuit including the primary winding T1 of the transformer T, the inductor L, and the capacitor C.

In a switching control circuit of the third preferred embodiment, the primary side has a half-bridge configuration. Therefore, the voltage applied to the first switching circuit S1 and the second switching circuit S2 is equal to the input voltage, and the voltage is reduced as compared to the device according to the first preferred embodiment. In general, the ON-resistance of a low-pressure-resistance switching element is reduced, and thus, the conduction loss due to the ON-resistance is reduced and high-efficiency is achieved. Also, the voltage applied to the transformer T is about one half that of the first preferred embodiment, and thus, the number of windings is reduced so as to achieve a compact and highly efficient transformer T.

Further, during the OFF-period of the first switching circuit S1, the electrostatic energy stored in the capacitor C is emitted as well as the exciting energy stored in the transformer T during the ON-time of the first switching circuit S1. Accordingly, the peak current applied to the transformer T and the switching circuit is reduced, thus reducing the effective current and conduction loss so as to contribute to high-efficiency.

Figure 11:
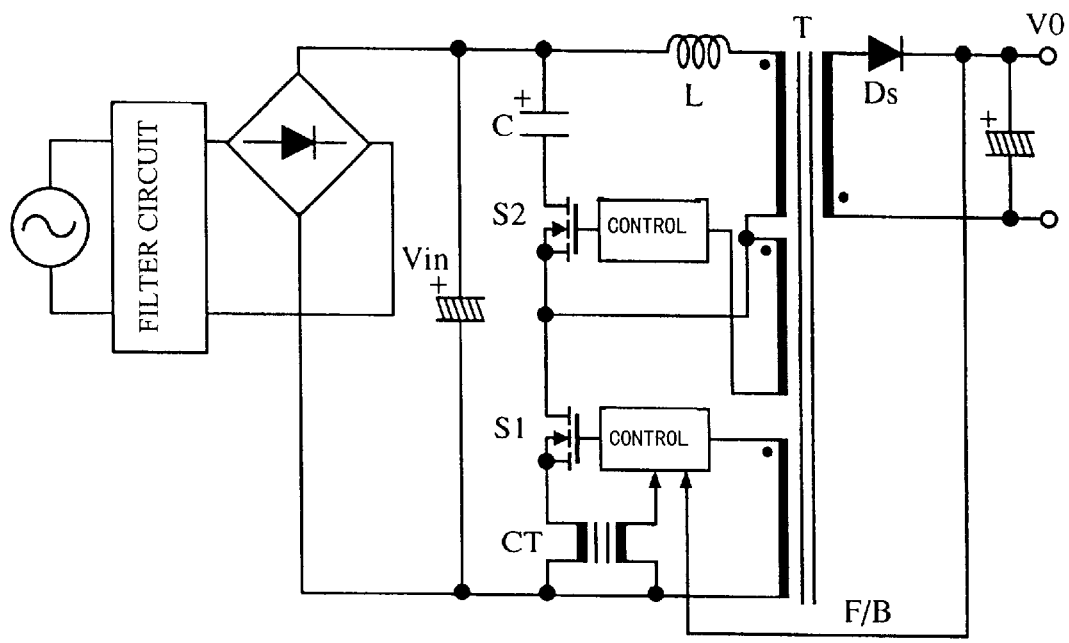
FIG. 11 shows a schematic configuration of a switching power supply unit according to a fourth preferred embodiment of the present invention.

FIG. 11 shows a schematic configuration of a switching power supply unit according to a fourth preferred embodiment of the present invention.

In the fourth preferred embodiment, a voltage generated by rectifying and smoothing a commercial AC voltage is used as the input voltage. Also, a current transformer CT is used as an output-voltage detecting circuit. By using the current transformer CT, loss in the output-voltage detecting circuit is reduced.

Figure 12:
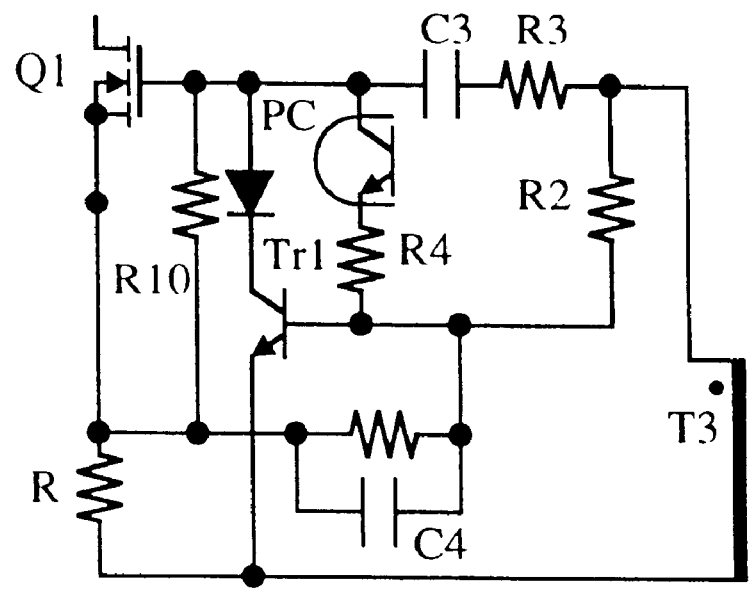
FIG. 12 shows a preferred embodiment of a drive control circuit of a first switching element Q1.

FIG. 12 shows a preferred embodiment of a drive control circuit of the first switching element Q1.

In this preferred embodiment, the transistors Tr1 and Tr3 shown in FIG. 1 are replaced by one transistor Tr1.

Figure 13:
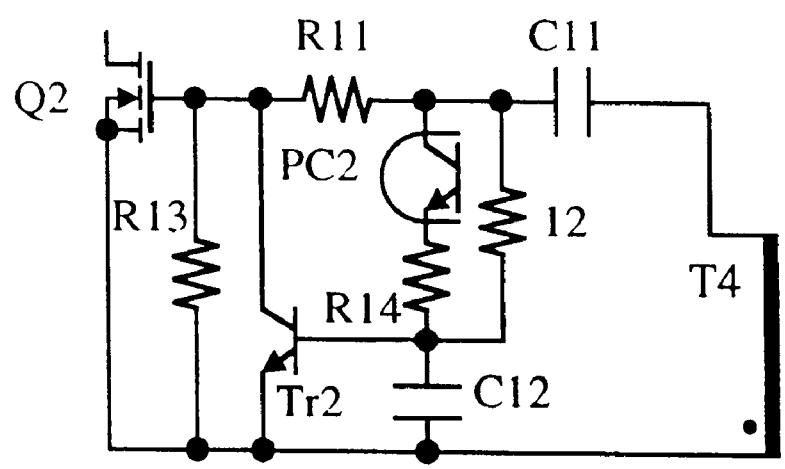
FIG. 13 shows a preferred embodiment of a drive control circuit of a second switching element Q2.

FIG. 13 shows a preferred embodiment of a drive control circuit of the second switching element Q2. In this preferred embodiment, the ON-time of the second switching element Q2 is varied according to the output and a signal. A phototransistor of a photocoupler PC2 is connected in series, for example, to the photodiode of the photocoupler PC in FIG. 1. Also, the phototransistor of the photocoupler PC2 is connected in series to a resistor R14 as shown in FIG. 13 so as to connect to the control terminal of the transistor Tr2. Accordingly, the ON-time of the second switching element Q2 is reduced under light load. With this arrangement, the circulating current is reduced and the efficiency is greatly improved.

In the above described preferred embodiments, each of the first and second switching elements Q1 and Q2 preferably include a field-effect transistor. By using a field-effect transistor, the parasitic capacitance thereof is used as the capacitor C1 or C2. Also, a parasitic diode is used as the diode D1 or D2. Accordingly, the number of components is greatly reduced, and a low-cost, compact, and lightweight switching power supply unit is achieved.

Also, a leakage inductor included in-the transformer T is preferably used as the inductor L. Accordingly, the number of components is further reduced, and a low-cost, compact, and lightweight switching power supply unit is achieved.

Further, since a capacitive impedance Cs is connected across the rectifying element Ds on the secondary side, the recovery loss of the rectifying element Ds is reduced, and thus, high-efficiency and low EMI noise are achieved.

According to preferred embodiments of the present invention, by operating the switching power supply unit in a current-continuation mode, in which the waveform of the current applied to the first switching element Q1 is trapezoidal, particularly under heavy load, the peak current applied to the transformer T and the first switching circuit and the effective current is greatly reduced. Accordingly, copper loss in the transformer and conduction loss in the first switching element Q1 are reduced such that a compact, lightweight, and highly efficient switching power supply unit is achieved.

Also, since a self-excited oscillation method is used, a drive circuit, such as an oscillator or a totem-pole circuit, is unnecessary. Thus, the number of components is further reduced such that a compact, lightweight, and low-cost switching power supply unit is achieved.

Further, the upper second switching element Q2, which is at a different ground level from the first switching element Q1, is driven by using the second drive winding, and thus, a pulse transformer, a high-pressure-resistance drive IC, and other components are not required. Accordingly, the number of components is further reduced, and a highly efficient, compact, lightweight, and low-cost switching power supply unit is achieved.

Also, in preferred embodiments of the present invention, the overcurrent protection circuit, which detects the peak current applied to the first switching element Q1 and which limits the peak, is provided. Accordingly, saturation of the transformer T and destruction of the switching elements, which are caused by an increase in the peak current during overcurrent or at startup, are prevented.

Further, the ON-time of the second switching element Q2 is maintained substantially constant by the second ON-time control circuit. Accordingly, the ON-time of the first switching element Q1 is controlled to be substantially constant such that the switching frequency is also substantially constant. Consequently, a reduction in the switching frequency is suppressed, the transformer and the smoothing circuit are miniaturized, and thus, a compact and lightweight switching power supply unit is achieved.

Additionally, in preferred embodiments of the present invention, the first and second ON-time limiting units, each of them being independent from each other, are provided as the overcurrent protection unit. Accordingly, the peak current is limited by the second ON-time limiting unit when overcurrent occurs, and when the overcurrent state further proceeds, the first ON-time limiting unit operates so as to reduce the maximum ON-time of the first switching element Q1. With this arrangement, an increase in the output current on the secondary side is suppressed and the short-circuit current is reduced.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A switching power supply unit operating in a current-continuation mode, comprising:
   a transformer including a primary winding, a secondary winding, a first drive winding, and a second drive winding;
   an input power supply supplying an input voltage to the primary winding;
   an inductor connected to the primary winding;
   a capacitor connected to the input power supply;
   a first switching circuit connected to the primary winding, the first switching circuit including a parallel circuit having a first switching element, a first diode, and a first capacitor;
   a second switching circuit connected to the first switching circuit, the second switching circuit including a parallel circuit having a second switching element, a second diode, and a second capacitor;
   a rectifying and smoothing circuit which includes a rectifying element and which is connected to the secondary winding; and
   first and second switching control circuits for alternately turning on/off the first and second switching elements, with a period when both the first and second switching elements are turned off therebetween, the first switching control circuit being connected between the first drive winding and a control terminal of the first switching element and the second switching control circuit being connected between the second drive winding and a control terminal of the second switching element; wherein
   energy is stored in the primary winding and the inductor during an ON-period of the first switching element and the energy is emitted from the secondary winding during an OFF-period of the first switching element such that the first and second switching elements perform self-excited oscillation;
   the inductor and the capacitor define a resonant circuit which resonates during the OFF-period of the first switching element;
   the first switching control circuit includes a first ON-time control circuit in which a time constant is set such that the first switching element is turned off at a desired time after the first switching element is turned on; and
   the second switching control circuit includes a second ON-time control circuit in which a time constant is set such that the second switching element is turned off in order to interrupt a resonant current applied to a series circuit including the second switching element and the inductor after the second switching element is turned on and before the energy is completely emitted from the secondary winding.

2. The switching power supply unit according to claim 1, wherein the input power supply and the first switching circuit are connected in series to a first series circuit including the inductor and the primary winding, and the capacitor and the second switching circuit define a second series circuit, the second series circuit being connected in parallel to the first series circuit.

3. The switching power supply unit according to claim 1, wherein the input power supply, the inductor, the primary winding, and the first switching circuit are connected in series, and the capacitor and the second switching circuit define a second series circuit, the second circuit being connected in parallel to the first switching circuit.

4. The switching power supply unit according to claim 1, wherein the input power supply, the capacitor, the inductor, the primary winding, and the first switching circuit are connected in series, the capacitor, the inductor, and the primary winding define a series circuit, and the second switching circuit is connected in parallel to the series circuit.

5. The switching power supply unit according to claim 1, further comprising an overcurrent protection unit including an overcurrent protection circuit which includes current detector connected in series to the first switching element, the overcurrent protection circuit limits an ON-time of the first switching element when the current applied to the first switching element detected by the current detector reaches a threshold.

6. The switching power supply unit according to claim 5, wherein the overcurrent protection circuit includes a third switch for turning off the first switching element, the third switch being connected to the control terminal of the first switching element, and the overcurrent protection circuit turns on the third switch when a peak current applied to the current detector reaches the threshold so as to turn off the first switching element.

7. The switching power supply unit according to claim 1, wherein at least one of the first switching control circuit and the second switching control circuit includes a delay circuit including one of a resistor and a series circuit including a resistor and a capacitor and which is connected between the drive winding and the control terminal of the switching element, and the delay circuit delays a voltage which is generated at the drive winding and which turns on the switching element so as to delay the turn on of the switching element.

8. The switching power supply unit according to claim 7, wherein a delay time is set in the delay circuit such that the switching element is turned on when a voltage applied across the switching element is decreased to zero or close to zero.

9. The switching power supply unit according to claim 1, wherein the first ON-time control circuit includes a first switch for turning on the first switch so as to turn off the first switching element at a desired time after a voltage for turning on the first switching element is generated at the first drive winding.

10. The switching power supply unit according to claim 1, wherein the second ON-time control circuit includes second switch turning off the second switching element and turns on the second switch in order to turn off the second switching element after a voltage for turning on the second switching element is generated at the second drive winding and before the energy is completely emitted from the secondary winding, whereby a current applied to the series circuit including the second switching element and the inductor is interrupted.

11. The switching power supply unit according to claim 1, wherein values of the inductor and the capacitor are set such that a resonant current applied to the inductor and the capacitor reaches close to a peak when a current applied to the inductor is interrupted by turning off the second switching element by the second switching control circuit.

12. The switching power supply unit according to claim 9, wherein the first ON-time control circuit includes a circuit varying a time when the first switching element is turned off according to a signal corresponding to an output voltage.

13. The switching power supply unit according to claim 6, wherein the third switch includes a transistor connected to the control terminal of the first switching element, the voltage generated at the current detector is applied to a control terminal of the transistor through a resistor, the transistor is turned on when the current applied to the first switching element reaches a desired value and the voltage at the control terminal of the transistor reaches a threshold, and the first switching element is turned off so as to limit the peak current applied to the first switching element.

14. The switching power supply unit according to claim 13, wherein the voltage generated at the first drive winding during the ON-period of the first switching element is input to the control terminal of the transistor through a resistor and a diode.

15. The switching power supply unit according to claim 13, wherein the overcurrent protection unit includes a first ON-time limiting unit defining the maximum ON-time of the first switching element and second ON-time limiting unit turning off the first switching element when the current applied to the first switching element reaches a desired value, the first and second ON-time limiting unit being independent from each other.

16. The switching power supply unit according to claim 1, wherein at least one of the first switching element and the second switching element includes a field-effect transistor.

17. The switching power supply unit according to claim 1, wherein the inductor includes a leakage inductor included in the transformer.

18. The switching power supply unit according to claim 1, wherein a capacitive impedance is connected across the rectifying element.

19. A switching power supply unit operating in a current-continuous mode, comprising:
  a transformer including a primary winding, a secondary winding, a first drive winding, and a second drive winding;
  an inductor;
  an input power supply;
  a first switching circuit including a parallel circuit including a first switching element, a first diode, and a first capacitor; wherein
    the primary winding, the inductor, the input power supply, and the first switching circuit are connected in series;
  a capacitor;
  a second switching circuit including a parallel circuit including a second switching element, a second diode, and a second capacitor; wherein
  a first series circuit includes the primary winding and the inductor;
  a second series circuit includes the capacitor and the second switching circuit;
  the second series circuit is connected to the first series circuit in parallel;
    a rectifying and smoothing circuit which includes a rectifying element and which is connected to the secondary winding; and
    first and second switching control circuits for alternately turning on/off the first and second switching elements, with a period when both the first and second switching elements are turned off therebetween, the first switching control circuit being connected between the first drive winding and a control terminal of the first switching element and the second switching control circuit being connected between the second drive winding and a control terminal of the second switching element; wherein
      energy is stored in the primary winding and the inductor during an ON-period of the first switching element and the energy is emitted from the secondary winding during an OFF-period of the first switching element such that the first and second switching elements perform self-excited oscillation;
      the inductor and the capacitor define a resonant circuit which resonates during the OFF-period of the first switching element;
      the first switching control circuit includes a first ON-time control circuit in which a time constant is set such that the first switching element is turned off at a desired time after the first switching element is turned on; and
      the second switching control circuit includes a second ON-time control circuit in which a time constant is set such that the second switching element is turned off in order to interrupt a resonant current applied to a series circuit including the second switching element and the inductor after the second switching element is turned on and before the energy is completely emitted from the secondary winding.

20. A switching power supply unit operating in a current-continuous mode, comprising:

a transformer including a primary winding, a secondary winding, a first drive winding, and a second drive winding;

an inductor;

an input power supply;

a first switching circuit comprising a parallel circuit including a first switching element, a first diode, and a first capacitor; wherein
the primary winding, the inductor, the input power supply, and the first switching circuit are connected in series;

a capacitor;

a second switching circuit comprising a parallel circuit including a second switching element, a second diode, and a second capacitor; wherein
a series circuit includes the capacitor and the second switching circuit;
the series circuit is connected to the first switching circuit in parallel;
a rectifying and smoothing circuit which includes a rectifying element and which is connected to the secondary winding; and
first and second switching control circuits for alternately turning on/off the first and second switching elements, with a period when both the first and second switching elements are turned off therebetween, the first switching control circuit being connected between the first drive winding and a control terminal of the first switching element and the second switching control circuit being connected between the second drive winding and a control terminal of the second switching element; wherein
the primary winding, the inductor, the first switching circuit, and the input power supply are connected in series,
energy is stored in the primary winding and the inductor during an ON-period of the first switching element and the energy is emitted from the secondary winding during an OFF-period of the first switching element such that the first and second switching elements perform self-excited oscillation;
the inductor and the capacitor define a resonant circuit which resonates during the OFF-period of the first switching element;
the first switching control circuit includes a first ON-time control circuit in which a time constant is set such that the first switching element is turned off at a desired time after the first switching element is turned on; and
the second switching control circuit includes a second ON-time control circuit in which a time constant is set such that the second switching element is turned off in order to interrupt a resonant current applied to a series circuit including the second switching element and the inductor after the second switching element is turned on and before the energy is completely emitted from the secondary winding.

21. A switching power supply unit operating in a current-continuous mode, comprising:

a transformer including a primary winding, a secondary winding, a first drive winding, and a second drive winding;

an inductor;

a capacitor;

an input power supply;

a first switching circuit including a parallel circuit including a first switching element, a first diode, and a first capacitor;

a second switching circuit including a parallel circuit including a second switching element, a second diode, and a second capacitor; wherein
the second switching circuit is connected in parallel to a series circuit including the primary winding, the inductor, and the capacitor;
a rectifying and smoothing circuit which includes a rectifying element and which is connected to the secondary winding; and
first and second switching control circuits for alternately turning on/off the first and second switching elements, with a period when both the first and second switching elements are turned off therebetween, the first switching control circuit being connected between the first drive winding and a control terminal of the first switching element and the second switching control circuit being connected between the second drive winding and a control terminal of the second switching element; wherein
the primary winding, the inductor, the capacitor, the first switching circuit, and the input power supply are connected in series;
energy is stored in the primary winding and the inductor during an ON-period of the first switching element and the energy is emitted from the secondary winding during an OFF-period of the first switching element such that the first and second switching elements perform self-excited oscillation;
the inductor and the capacitor form a resonant circuit which resonates during the OFF-period of the first switching element;
the first switching control circuit includes a first ON-time control circuit in which a time constant is set such that the first switching element is turned off at a desired time after the first switching element is turned on; and
the second switching control circuit includes a second ON-time control circuit in which a time constant is set so that the second switching element is turned off in order to interrupt a resonant current applied to a series circuit including the second switching element and the inductor after the second switching element is turned on and before the energy is completely emitted from the secondary winding.

* * * * *